United States Patent [19]

Nakamura

[11] Patent Number: 5,340,304
[45] Date of Patent: Aug. 23, 1994

[54] MOLD FOR INJECTION MOLDING PREFORM WITH UNDERCUT LIP

[75] Inventor: Yoshinori Nakamura, Ueda, Japan

[73] Assignee: Nissei ASB Machine Co., Ltd., Nagano, Japan

[21] Appl. No.: 865,207

[22] Filed: Apr. 8, 1992

[30] Foreign Application Priority Data

Apr. 26, 1991 [JP] Japan .................. 3-125016

[51] Int. Cl.⁵ ............................................ B29C 45/44
[52] U.S. Cl. ............................... 425/577; 425/438; 425/443; 425/DIG. 58; 425/528
[58] Field of Search ............. 425/436 R, 438, 443, 425/577, DIG. 58, 528

[56] References Cited

U.S. PATENT DOCUMENTS

| | | | |
|---|---|---|---|
| 3,377,659 | 4/1968 | Hucks, Jr. ............. | 425/DIG. 58 |
| 3,940,103 | 2/1976 | Hilaire ................... | 425/443 |
| 4,521,178 | 6/1985 | Anger .................... | 425/438 |
| 4,541,795 | 9/1985 | Cole ...................... | 425/438 |
| 4,618,121 | 10/1986 | Conti .................... | 425/DIG. 58 |
| 5,114,655 | 5/1992 | Cole ...................... | 425/438 |
| 5,114,659 | 5/1992 | Krall ..................... | 425/438 |

FOREIGN PATENT DOCUMENTS

| | | |
|---|---|---|
| 0076980 | 4/1983 | European Pat. Off. ............ 425/438 |
| 0355235 | 2/1990 | European Pat. Off. . |
| 2452652 | 10/1980 | France . |
| 1577385 | 10/1980 | United Kingdom . |
| 2145364 | 3/1985 | United Kingdom . |

*Primary Examiner*—Jay H. Woo
*Assistant Examiner*—Robert B. Davis
*Attorney, Agent, or Firm*—Oliff & Berridge

[57] ABSTRACT

The present invention provides an injection mold having an injection core mold for defining the inner wall of a lip portion in a preform having an undercut, a first lip cavity mold for defining the outer wall of the lip portion having no undercut, and a second lip cavity mold for defining the outer wall of the lip portion having the undercut. In the initial release after the injection molding process of the preform, the second lip cavity mold is first moved upwardly to secure a space wherein there is no obstruction around the outer periphery of the undercut. Thereafter, the injection core mold is upwardly moved such that the second injection core mold can be forcedly released from the molded preform while resiliently deforming the undercut in the outward direction, utilizing the space so formed. The barrel portion of the preform so molded is biaxially stretched to provide a so-called roll-on type biaxially oriented vessel having a ball received in the lip portion thereof.

4 Claims, 6 Drawing Sheets

MOLD FOR INJECTION MOLDING PREFORM WITH UNDERCUT LIP

BACKGROUND OF THE INVENTION

1. Field of the Invention

The present invention relates to a mold for injection molding a preform having an undercut lip portion and a plastic vessel, which is biaxially stretch blow molded from such a preform.

2. Description of the Related Art

A roll-on type vessel is known which receives a ball therein at the open top. The fluid content of the vessel can be applied to a sheet of paper by holding the vessel upside down and moving the ball received in the open top of the vessel on the sheet of paper in rolling contact therewith. When such vessel is to be molded of plastic material, the open top of the vessel must be of an undercut configuration which extends inwardly, proceeding in a direction toward the open top of the vessel.

In each case when a hollow vessel is to be injection blow molded or stretch blow molded, a preform having a cylindrical closed-end barrel portion and a lip portion formed therein at the open top of the barrel portion is first injection molded. Pressurized air is then introduced into the interior of the preform barrel portion to blow mold a plastic vessel. In the stretch blow molding process, a stretching rod also is used to stretch the preform in its longitudinal axis while being blow molded.

In the stretch blow molding process, the injection molding of the preform is carried out by the use of an injection core mold for defining the lip and inner barrel wall of the preform, an injection cavity mold for defining the outer barrel wall of the preform and a lip cavity mold for defining the outer wall of the lip portion. Molten resin material is injected into a space defined between the inner cavity walls of the injection and lip cavity molds and the outer wall of the injection core mold to form a preform. Thereafter, the molded preform will be removed out of the injection cavity mold, for example, by moving the injection core mold and the lip cavity mold in the upward direction, with the injection core mold being drawn out from the interior of the molded preform.

In order to form a roll-on type vessel, the lip portion of the preform must have an undercut which extends inwardly proceeding in a direction toward the open top of the vessel. Thus, an undercut area will be defined between the lip cavity mold and the core mold.

However, such a mold structure disables the release of a molding from the mold. Namely, the undercut of the molded preform as well as the mold will be damaged when the injection core mold is drawn out from the interior of the molded preform. At this time, the preform is held only by a pair of lip cavity mold sections which can be moved to their closed or opened position. Therefore, these lip cavity mold sections may not be moved away from each other during the injection molding process. A space where the preform can resiliently deform at its undercut will not be around the preform at all since the preform is held by the lip cavity mold on releasing the injection core mold.

In the injection blow molding process, the injection core mold also functioning as means for introducing the blow air is lastly separated from the blow molded vessel. Thus, it can secure a space where the undercut area of the lip portion can be resiliently deformed. However, the plastic materials which can be released by resiliently deforming such an undercut area in the prior art injection blow molding process are limited to relatively soft plastic materials such as polypropylene, polyethylene and the like. The mechanical strength and other properties of vessels formed by the injection blow molding process are inferior to those of vessels formed by the stretch blow molding process since the vessels are not biaxially stretched in the injection blow molding process.

SUMMARY OF THE INVENTION

It is therefore an object of the present invention to provide an injection mold which can injection mold a preform to be biaxially stretch blow molded with a lip portion having an undercut and also which can release the core mold without damaging of the undercut.

Another object of the present invention is to provide an injection mold which can release the core mold by resiliently deforming the undercut formed on the lip portion even if it is molded of a relatively hard plastic material.

Still another object of the present invention is to provide a plastic vessel which comprises a lip portion having an undercut formed by the injection molding process and a biaxially oriented barrel portion.

To this end, the present invention provides an injection mold for injection molding a preform having a cylindrical closed-end barrel portion and a lip portion formed in said barrel portion at the open end thereof, the lip portion including an undercut formed to extend inwardly as goes toward the open end of the barrel portion, said injection mold comprising:

- an injection core mold having an outline defining the inner walls of said lip and barrel portions, said injection core mold being movable along the longitudinal axis relative to said preform;
- an injection cavity mold having a cavity surface defining the outer wall of said barrel portion, said injection cavity mold being movable along the longitudinal axis relative to said preform;
- a first lip cavity mold positioned adjacent to said injection cavity mold on mold closure and having a cavity surface defining the outer wall of the non-undercut area of said lip portion, said first lip cavity mold including a pair of lip cavity mold sections movable toward or away from each other in the transverse direction;
- a second lip cavity mold positioned adjacent to said first lip cavity mold on mold closure and having a cavity surface defining the outer wall of the undercut area of said lip portion, said second lip cavity mold being movable along the longitudinal axis relative to said preform; and
- a mold driving mechanism for performing the initial release movement of said second lip cavity mold relative to the preform in the longitudinal direction by an initial amount of movement required to secure a space around said undercut area and thereafter causing said injection core mold to move relative to said preform in the longitudinal direction while resiliently deforming said undercut area outwardly.

In accordance with the present invention, the lip cavity mold means defining the outer wall of the lip portion is formed by two lip cavity mold halves. The first lip cavity mold comprising a pair of mold halves is used to define the outer wall of the lip portion at its non-undercut area. These mold halves can be maintained at their closed position to hold the lip portion of the preform after it has been injection molded. On the other hand, the second lip cavity mold for defining the outer wall of the lip portion at its undercut area is moved in the longitudinal direction relative to the preform to secure a space around the outer periphery of said undercut area after the preform has been injection molded.

The undercut of the lip portion will be formed in a cavity formed between the second lip cavity mold and the injection core mold. On release, the initial release motion of the second lip cavity mold is first carried out prior to the longitudinal release motion of the injection core mold relative to the molded preform. Thus, the undercut can be resiliently deformed within the space therearound when the injection core mold is released. As a result, the injection core mold can be forcedly released from the molded preform.

In addition, this release motion of the injection core mold is carried out immediately after the preform has been injection molded. The resilient deformation of the undercut area will be made utilizing the potential heat in the lip portion provided by the injection molding process. Therefore, the undercut will not be damaged even if a preform is injection molded from a relatively hard plastic material.

The present invention also provides a plastic vessel comprising a lip portion formed therein at its open end when a cylindrical closed-end preform is injection molded into the vessel and a cylindrical biaxially oriented closed-end barrel portion formed by biaxially stretch blow molding the barrel portion of said preform, said lip portion rotatably receiving and holding a ball, and said lip portion having at least two wall portions, a first wall portion that extends outwardly proceeding in a direction toward the open end of the lip portion, and is in contact with the lower half of said ball and a second wall portion that is formed into an undercut configuration extending inwardly, proceeding in a direction toward the open end of said lip portion, and in contact with the upper half of said ball, said second wall portion including a plurality of circumferentially spaced slits formed therein, each of said slits extending from the free end to the proximal end of said second wall portion.

In such a vessel, the lip portion thereof can rotatably receive and hold the ball in a reliable manner since the first wall of the lip portion is in rolling contact with the lower half of the ball and the second undercut wall of the lip portion is in rolling contact with the upper half of the ball. As described, the lip portion of the preform is injection molded at the same time when the preform is injection molded and before the preform is biaxially stretch blow molded into the vessel. Since the second undercut wall portion is formed with a plurality of circumferentially spaced slits extending from the free end to the proximal end of the lip portion, the second wall can be resiliently deformed when the injection core mold is forcedly released from the molded vessel. Thus, the yield can be improved. In addition, the resilient deformation of the undercut area can be carried out utilizing the potential heat provided by the injection molding process. Even if a preform to be molded into a desired vessel is injection molded from a relatively hard plastic material, the vessel can be formed without damage in the undercut.

DETAILED DESCRIPTION OF PREFERRED EMBODIMENTS

Figure 6:
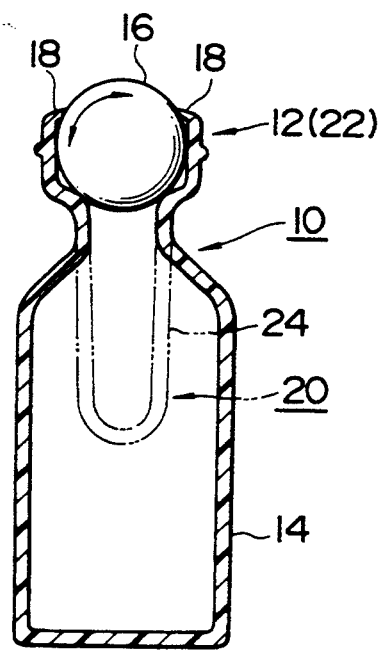
FIG. 6 is a schematically cross-sectional view of a roll-on type vessel.

Referring first to FIG. 6, there is shown a vessel 10 biaxially stretch blow molded from a preform 20. The vessel 10 includes a cylindrical closed-end barrel portion 14 and a lip portion 12 formed therein at the open end of the barrel portion 14, the lip portion 12 rotatably receiving and holding a ball 16. The barrel portion 14 is biaxially oriented to improve the mechanical characteristics with oriented crystallization. When the vessel 10 is manually held upside down and moved on a matter to be applied with the ball 16 being rolled, the liquid content of the vessel 10 is applied onto the matter little by little. Such a vessel 10 is referred to as a "roll-on type vessel".

In order to provide such a roll-on type vessel, the lip portion 12 must have an undercut 18 formed to extend inwardly proceeding in a direction toward the open end of the vessel. The preform 20 used to biaxially stretch blow mold the vessel 10 is required to have a cylindrical closed-end barrel portion 24 as shown by chain line in FIG. 6 and a lip portion 22 formed at the open end of the barrel portion 24 and having substantially the same configuration as that of the lip portion 12 of the vessel 10. Therefore, the undercut 18 of the lip portion 22 must be formed at the same time when the preform 20 is injection molded.

Figure 1:
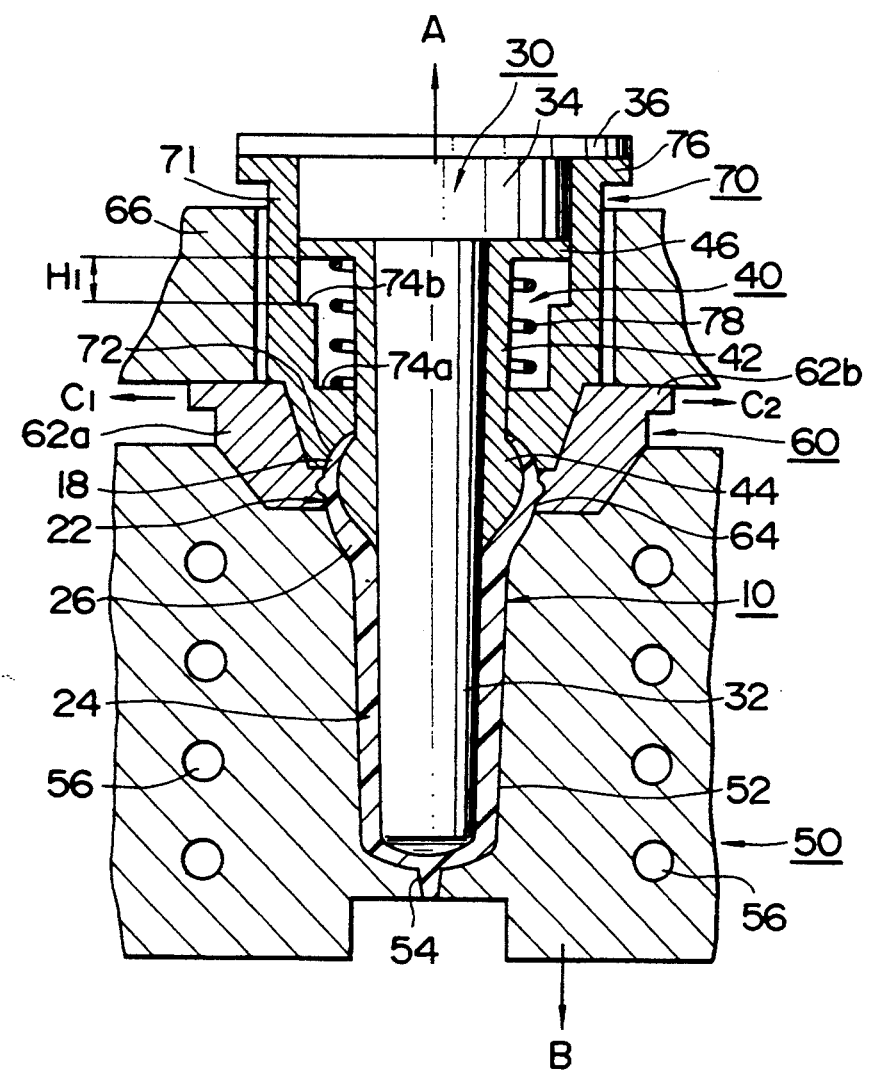
FIG. 1 is a schematically cross-sectional view of a preform injection mold into which the present invention is incorporated.

FIG. 1 is a cross-sectional view of an injection mold which can injection mold the preform 20 used to mold the vessel 10 shown in FIG. 6. In general, the injection mold comprises a first injection core mold 30, a second injection core mold 40, an injection cavity mold 50, a first lip cavity mold 60 and a second lip cavity mold 70.

The first injection core mold 30 comprises a rod-like core pin portion 32 for defining the inner wall of the barrel portion 24 of the preform 20 and a proximal end portion 34 having a diameter larger than that of the core pin portion 32. The top of the proximal end portion 34 includes a flange 36 formed therein to extend radially outwardly from the top of the proximal end portion 34. The first injection core mold 30 is movable away from the preform 20 in a direction shown by an arrow A. The core pin portion 32 may be cooled by circulating a cooling medium therethrough.

The second injection core mold 40 comprises a barrel portion 42 through which the core pin portion 32 of the first core mold 30 passes and a bulged portion 44 formed therein at the bottom end of the barrel portion 42 and adapted to define the inner wall of the lip portion 22 of the preform 20. The top end of the barrel portion 42 is provided with a flange 46 having an external diameter that is equal to the internal diameter of the proximal end portion 34 of the first injection core mold 30.

The injection cavity mold 50 includes a cavity surface 52 for defining the outer walls of the barrel and shoulder portions 24, 26 in the preform 20, the shoulder portion 26 being located above the barrel portion 24. The injection cavity mold 50 further includes a gate port 54 formed therein at its central lower end, the gate port 54 being opened at the cavity surface 52. A cooling jacket 56 is formed in the injection cavity mold 50 to surround the cavity surface 52 thereof. The injection cavity mold 50 may be moved relative to the preform 20 in a direction shown by an arrow B in FIG. 1. In this embodiment, however, the injection cavity mold 50 is stationary while the preform 20 is drawn out from the injection cavity mold 50.

The first lip cavity mold 60 is of a split type comprising a pair of mold halves 62a and 62b which are movable away from each other in the transverse direction as shown by arrows C1 and C2 in FIG. 1. The mold halves 62a and 62b form a cavity surface 64 for defining the outer wall of the lower region of the preform lip portion 22 which does not include the undercut 18. The first lip cavity mold 60 is supported by a support plate 66. After the preform 20 has been injection molded, the first lip cavity mold 60 can be moved to the subsequent steps such as temperature regulating step and biaxial-stretch blow molding step while holding the preform 20.

The second lip cavity mold 70 comprises a hollow cylinder 71 surrounding the first and second injection core molds 30 and 40. The bottom end of the second lip cavity mold 70 forms a cavity surface 72 for defining the open end of the lip portion 22 of the preform 20, that is, the lip region that includes the undercut 18. The top of the hollow cylinder 71 is provided with a flange 76 which is rigidly connected to the flange 36 of the first injection core mold 30. Thus, the second lip cavity mold 70 is movable with the first injection core mold 30 as a unit in the direction A. The cylinder 71 of the second lip cavity mold 70 has an inner stepped wall 74b located at a position spaced a given distance above the inner bottom wall 74a of the cylinder 71. A coil spring 78 is located between the inner bottom wall 74a of the cylinder 71 and the flange 46 of the second injection core mold 40. The coil spring 78 biases the second lip cavity mold 70 in the downward direction.

The preform 20 will be injection molded and released in the following manner.

After the respective molds have been placed in such positions as shown in FIG. 1., a molten resin material such as polyethylene terephthalate (PET) is injected into the cavity formed by the molds through the gate port 54 under a given pressure to mold the preform 20. After the injection molded preform 20 has been cooled in the injection cavity mold 50 For a given period of time, the respective molds begin to be released.

Since the injection cavity mold 50 is stationary in this embodiment, the support plate 66 is moved and released upwardly to perform the upward movement of the first and second injection core molds 30, 40 and the first and second lip cavity molds 60, 70 as a unit. As a result, the preform 20 may be removed from the injection cavity mold 50.

After or during this release drive, the first injection core mold 30 is moved and released in the direction A of FIG. 1. Since the first injection core mold 30 is rigidly connected with the second lip cavity mold 70 through the rigid connection between their flanges 36 and 76, the first injection core mold 30 will also be moved with the second lip cavity mold 70 in the upward direction A. The state after this initial movement is shown in FIG. 2A.

Figure 2A:
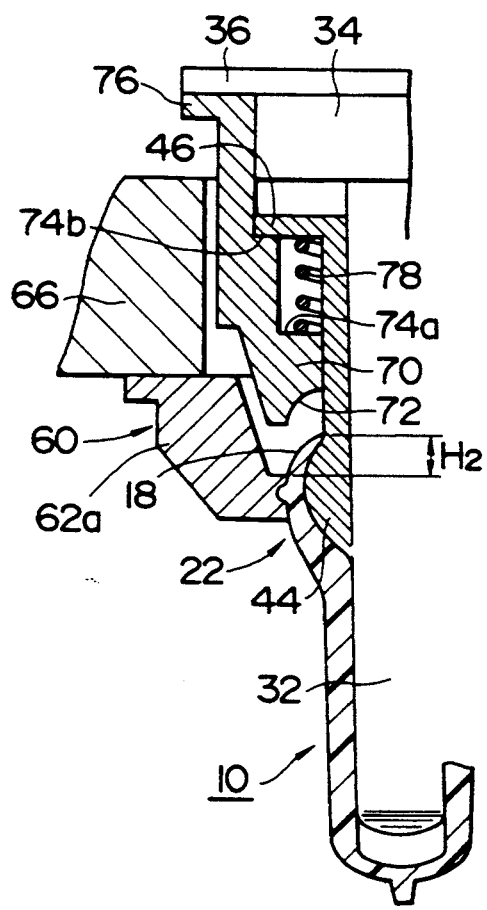
FIGS. 2A and 2B are schematically cross-sectional views illustrating the releasing of the injection mold shown in FIG. 1 near the lip portion of the molded preform.

As seen from FIG. 2A, the first injection core mold 30 is moved upwardly with the second lip cavity mold 70 as a unit, although the second injection core mold 40 remains at its place. This is because the bulged portion 44 of the second injection core mold 40 is prevented from being moved upwardly by engagement with the undercut 18 of the preform 20. During this movement, thus, the coil spring 78 will be compressed between the flange 46 of the second injection core mold 40 and the inner bottom face 74a of the second lip cavity mold 70. After such an initial movement as shown in FIG. 2A, there will be established a positional relationship wherein the second lip cavity mold 70 is not present around the outer periphery of the undercut 18 of the preform 20 at all. For this purpose, the following relationship is set:

$$H1 > H2$$

where H1 is a distance between the inner stepped wall 74b of the second lip cavity mold 70 and the underside of the flange 46 of the second injection core mold 40 and H2 is a height required to secure a space around the outer periphery of the undercut 18.

After the state of FIG. 2A has been accomplished, the first injection core mold 30 is further moved upwardly. This causes the inner stepped wall 74b of the second lip cavity mold 70 upwardly moved with the first injection core mold 30 to lift the second injection core mold 40. As a result, these three molds will be moved upwardly as a unit.

Figure 2B:
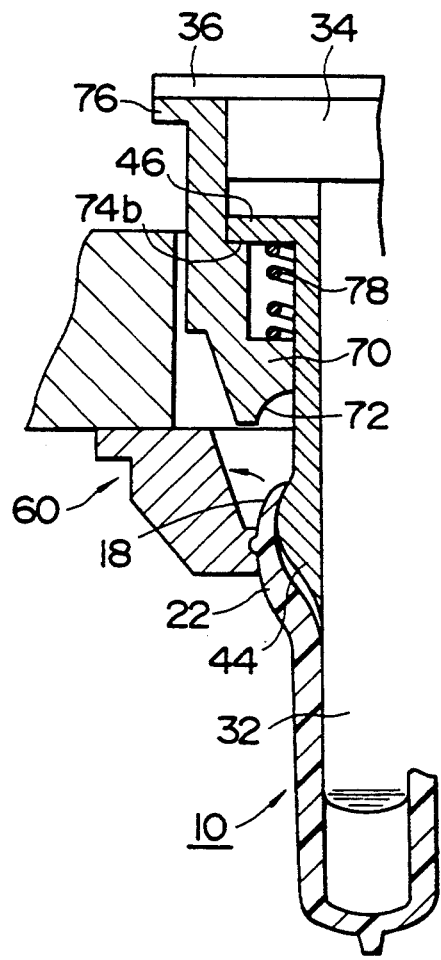

Such a state is shown in FIG. 2B. The bulged portion 44 of the second injection core mold 40 will be moved upwardly. At this time, the undercut 18 of the preform 20 can be easily deformed outwardly since there is no obstruction around the outer periphery of the undercut 18. Therefore, such a force as resists the upward movement of the bulged portion 44 can be reduced substantially. The second injection core mold 40 having the bulged portion 44 can be forcedly released out of the preform 20 in spite of the presence of the undercut 18. Moreover, this releasing is carried out immediately after the preform 20 has been injection molded. The resilient deformation of the lip portion 22 can be performed utilizing the potential heat in the lip portion 22 which has been provided by the injection molding process. This is clearly understood when the process of the present invention is compared with the conventional injection blow molding process. In the conventional injection blow molding process, the release of the core pin was carried after a final product has been blow molded from the injection molded preform. During this procedure, the preform was regulated into a temperature lower than the temperature just after the injection molding by the core pin. Thus, the core pin was released after the neck portion of the final product has been cooled sufficiently by the core pin.

Since in this embodiment, the resilient deformation of the undercut 18 on releasing the core mold can be carried out utilizing the potential heat in the lip portion which is provided by the injection molding of the preform, the present invention will not damage the undercut 18 even if the preform is formed of a hard plastic material, in comparison with the conventional injection blow molding process. Therefore, plastic materials usable in the present invention will not be limited to polyethylene (PE) having its tensile modulus ranged between 7000 kgf/cm² and 10000 kgf/cm² or polypropylene (PP) having its tensile modulus ranged between 11000 kgf/cm² and 16000 kgf/cm² The present invention can select any plastic material adaptable to the desired characteristics of the final vessel. In addition to the conventional plastic materials, PE and PP, the present invention can mold a plastic vessel without damage of its undercut even if the plastic material to be molded into a preform is selected from any one of hard plastic materials having their tensile modulus equal or higher than 7000 kgf/cm² and particularly beyond 18000 kgf/cm² which could not be used in the conventional injection blow molding process. It is particularly very significant that the present invention can use PET having its tensile modulus ranged between 23000 kgf/cm² and 29000 kgf/cm² and capable of providing a plastic vessel improved in characteristic when it is biaxially oriented. Furthermore, the present invention can use the other plastic materials such as polycarbonate(PC) having its tensile modulus equal to about 25000 kgf/cm² polyamide(PA) polyethylene naphthalate (PEN) and so on.

In such a manner, the aforementioned embodiment of the present invention can release the second lip cavity mold 70 together with the first injection core mold 30 as a unit when the latter is axially moved away from the molded preform, and yet also release the second injection core mold 40 at such a timing that no obstruction presents around the outer periphery of the preform undercut 18. Any other power transmission means may be used if it can realize the release motion of the second injection core mold 40 after the initial movement. For example, the inner stepped wall 74b and coil spring 78 may be replaced by any other suitable actuator means such as pneumatic or hydraulic cylinder which is located between the flange 46 and the inner bottom wall 74a.

A modification of the aforementioned embodiment in which the first and second injection core molds 30, 40 are replaced by a single injection core mold 80 will be described with reference to FIGS. 3 and 4.

Figure 3:
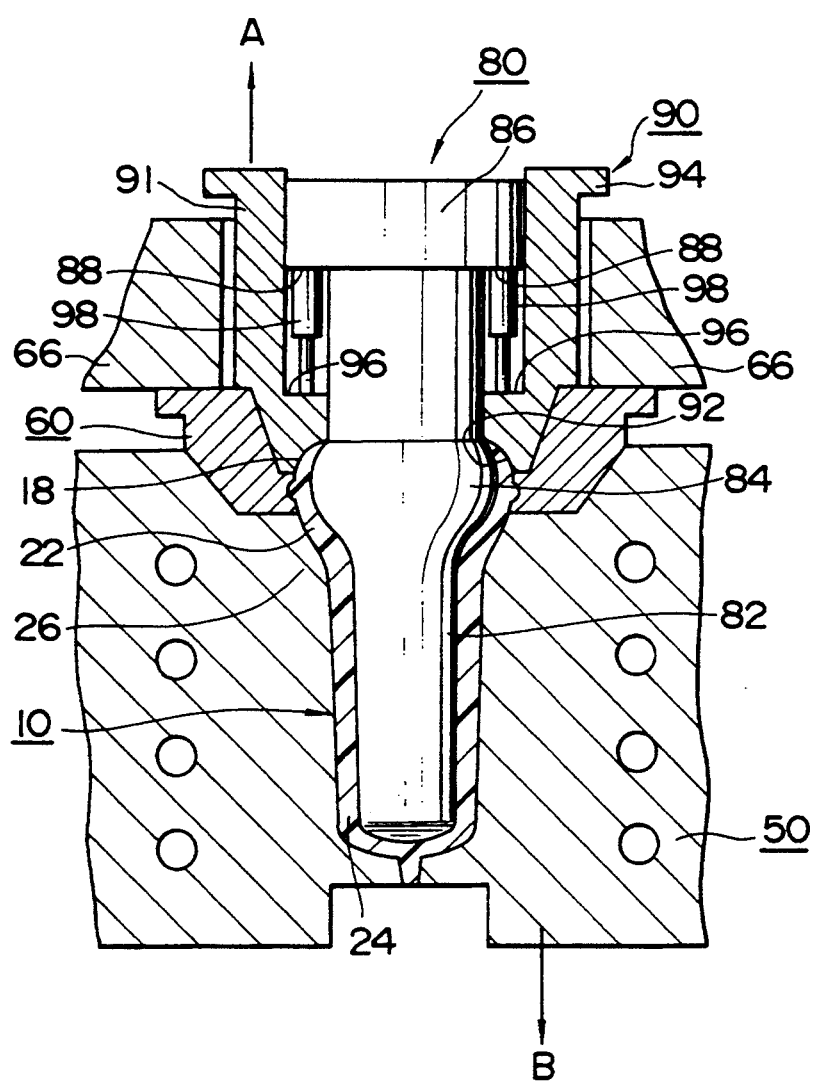
FIG. 3 is a schematically cross-sectional view of a modified injection mold of the present invention.

As best seen from FIG. 3, the single injection core mold 80 comprises a core pin portion 82 for defining the inner wall of the barrel portion of the preform 20, a bulged portion 84 for defining the inner wall of the lip portion of the preform 20, and a proximal end portion 86. On the other hand, a second lip cavity mold 90 comprises a cylindrical portion 91 which passes through the proximal end portion 86 and a cavity surface 92 for defining the outer wall of the lip portion 22 of the preform 20 which includes the undercut 18. The proximal end portion 86 at the top end of the cylindrical portion 91 is connected to any suitable lift drive means such as pneumatic or hydraulic cylinder. An actuator 98 such as pneumatic or hydraulic cylinder is connected between the inner bottom wall 96 of the second lip cavity mold 90 and the underside 88 of the proximal end portion 86 of the injection core mold 80.

In such an arrangement, the injection mold will operate as follows:

When the second lip cavity mold 90 is initially moved upwardly by means of any suitable drive (not shown), this initial and upward movement is absorbed by the actuator 98 without transmission to the injection core mold 80.

Figure 4A:
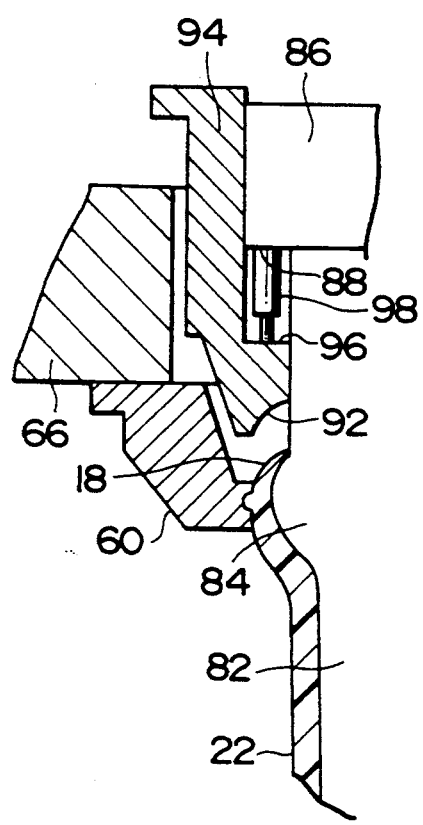
FIGS. 4A and 4B illustrate the releasing of the injection mold shown in FIG. 3 near the lip portion.
Figure 4B:
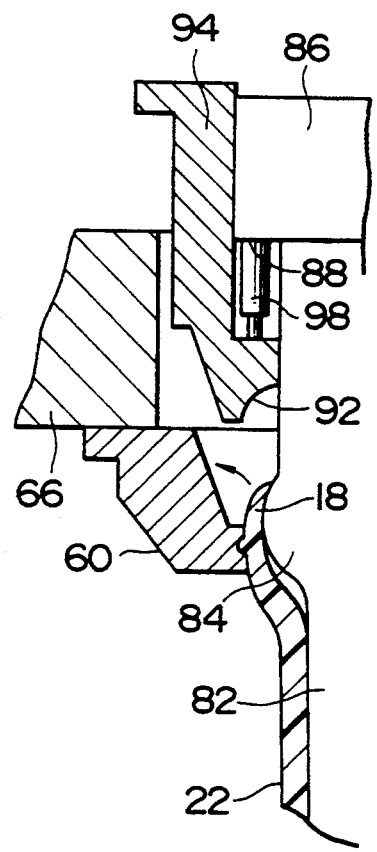

The initial movement will secure a space wherein there is no obstruction around the outer periphery of the undercut 18 of the preform 20, as shown in FIG. 4A. After such an initial movement, the second lip cavity mold 90 is further moved upwardly. This upward movement is then transmitted to the injection core mold 80 through the actuator 98. As shown in FIG. 4B, therefore, the injection core mold 80 can be forcedly released from the molded preform by resiliently deforming the undercut 18.

In the embodiment of FIG. 3, the actuator 98 may be replaced by the mechanism consisting of the inner stepped wall and coil spring which is shown in FIG. 1.

The lip portion 22 of the preform 20 formed by the above mentioned injection mold will be described in more detail below.

Figure 5A:
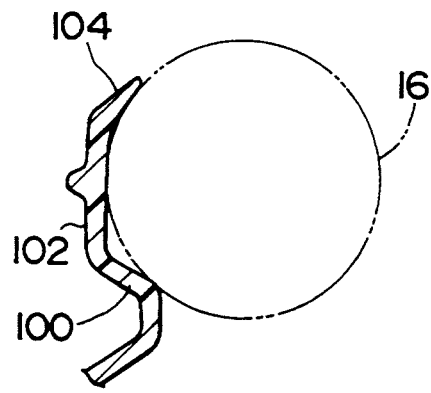
FIG. 5A is a cross-sectional view of the lip portion of a plastic vessel formed in accordance with the present invention.
Figure 5B:
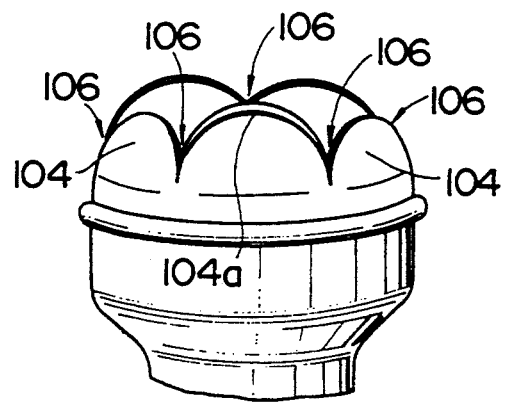
FIG. 5B is a schematically perspective view of the lip portion.

FIG. 5A is an enlarged cross-sectional view of the lip portion 22 while FIG. 5B is a schematically perspective view of the same lip portion 22.

Referring to FIGS. 5A and 5B, the lip portion 22 rotatably receives and holds a ball 16. In the cross-sectional view the inner wall of the lip portion 22 is in three-point contact with the ball 16. Tile three contact points performed by a first sloped wall portion 100, a vertical wall portion 102 and a second sloped wall portion 104.

The first sloped wall portion 100 is inclined outwardly as goes toward the open end of the lip portion 22 and in linear contact with the circumferential portion at the lower half of the ball 16. The second sloped wall portion 104 is formed into an undercut configuration which is inclined inwardly as goes toward the open end of the lip portion 22 and in linear contact with the circumferential portion at the upper half of the ball 16. The wall thickness of the lip portion 22 is decreased, proceeding in a direction toward the open end thereof. The vertical wall portion 102 connects the first wall portion 100 with the second wall portion 104 and is in linear contact with the circumferential portion between the upper and lower halves of the ball 16.

The second sloped wall portion 104 providing the undercut is further characterized by that it includes a plurality of circumferentially spaced slits 106 formed therein to extend from the free end portion 104a to the proximal end portion 104b. The number of such slits 106 is five, for example. Each of the slits 106 has its width increased toward the free end portion 104a. As an example, each of the slits 106 may be formed to have an arcuated top edge. In such a case, the second sloped wall portion 104 will be entirely formed into an inwardly inclined multipetalous configuration.

Figure 7A:
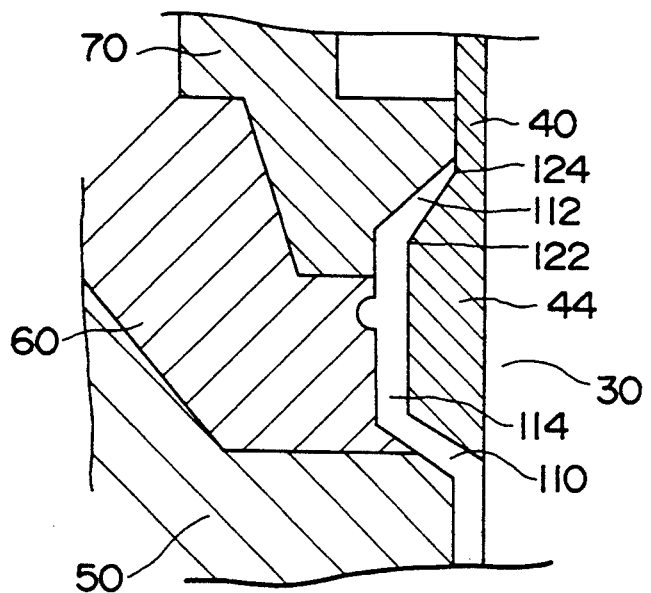
FIGS. 7A and 7B are schematically cross-sectional views illustrating the injection mold clamped to mold the undercut.
Figure 7B:
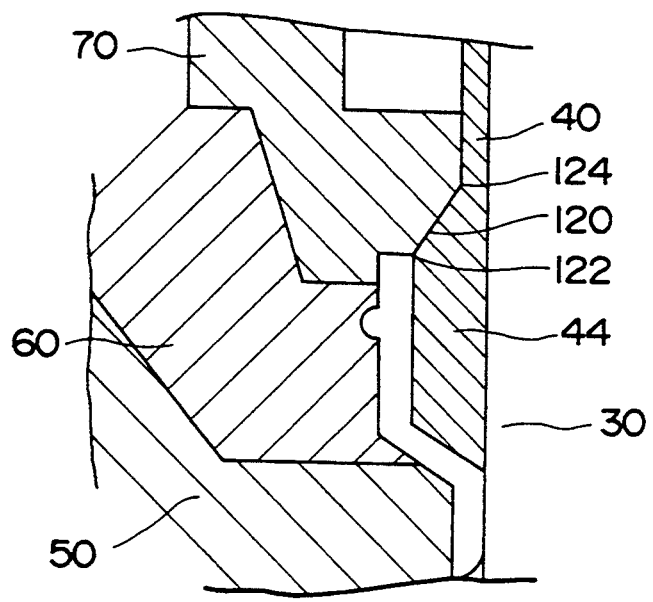

FIGS. 7A and 7B show an injection mold clamped to mold the aforementioned lip portion 22. As shown in FIG. 7A, a second lip cavity 110 used to form the first sloped wall portion 100 is defined by the first and second injection core molds 30, 40, the injection cavity mold 50 and the first lip cavity mold 60. A first lip cavity 112 for forming the second sloped wall portion 104 is defined by the second injection core mold 40 and the second lip cavity mold 70. The second lip cavity 112 is tapered to reduce its thickness in a direction from the proximal end 122 to the outer edge portion 124 of the second lip cavity 112. A third lip cavity 114 for forming the vertical wall portion 102 is defined by the second injection core mold 40 and the first lip cavity mold 70. The second injection core mold 40 is in contact with the second lip cavity mold 70 at positions corresponding to the respective slits 106 in a plane including the slits 106, as shown by a contact plane 120 in FIG. 7B. The circumference of the contact plane 120 is minimum at the proximal end 122 and increases toward the free end portion or the outer edge portion 124. The outer edge portion 124 is curved into an arcuated configuration in the circumferential direction.

Since the lip portion 22 is formed with the slits 106 near the free end 104a of the second sloped wall portion 104 and is reduced in thickness toward the open end of the lip portion 22, the second sloped wall portion 104 can be resiliently deformed in an extremely easy manner when the injection core mold is forcedly released from the injection molded preform 20. This improves the yield by a substantial amount. If each of the slits 106 is formed to have its width increased toward the free end 104a thereof, the free end 104a of the lip portion 22 can be more deformed resiliently to more smoothly the release of the injection core mold. Moreover, the free end 104a of the second sloped wall portion 104 tends to cause short molding if its thickness is reduced since the free end 104a is most remote from the gate. In order to overcome this problem, it has been found that the most effectiveness can be attained when the free end 104a of the second sloped wall portion 104 is formed into a multipetalous configuration.

I claim:

1. An injection mold for injection molding a preform having a cylindrical closed-end barrel portion and a lip portion formed on said barrel portion at an open end thereof, the lip portion including an undercut formed to extend inwardly, proceeding in a direction toward the open end of the barrel portion, said injection mold comprising:

an injection core mold having an outer surface defining inner walls of said lip and barrel portions, said injection core mold being movable along a longitudinal axis relative to said preform;

an injection cavity mold having a cavity surface defining an outer wall of said barrel portion, said injection cavity mold being movable along the longitudinal axis relative to said preform;

a first lip cavity mold positioned adjacent to said injection cavity mold on mold closure and having a cavity surface defining an outer wall of a non-undercut area of said lip portion, said first lip cavity mold including a pair of lip cavity mold halves movable toward and away from each other in a transverse direction;

a second lip cavity mold positioned adjacent to said first lip cavity mold on mold closure and having a cavity surface defining an outer wall of the undercut of said lip portion, said second lip cavity mold being movable along the longitudinal axis relative to said preform;

a mold driving mechanism comprising means for effecting an initial release movement of said second lip cavity mold relative to the preform in the longitudinal direction by an initial amount of movement required to secure a space around said undercut area and means for thereafter causing said injection core mold to move relative to said preform in the longitudinal direction while resiliently deforming said undercut area outwardly;

wherein said injection core mold includes a core pin for defining the inner walls of said lip and barrel portions and a proximal end portion having an external diameter larger than that of said core pin, and wherein said second lip cavity mold includes a cylindrical portion surrounding a portion of said proximal end portion and having an inner bottom wall formed therein at a position opposite to the proximal end portion of said injection core mold and wherein said mold driving mechanism includes means for driving said second lip cavity mold in the direction of said longitudinal axis; and wherein a side wall of the cylindrical portion of said second lip cavity mold includes an inner stepped wall formed therein to engage the proximal end portion of said injection core mold after said initial release movement and wherein a spring is disposed between said proximal end portion and said inner bottom wall.

2. An injection mold for injection molding a preform having a cylindrical closed-end barrel portion and a lip portion formed in said barrel portion at the open end thereof, the lip portion including an undercut formed to extend inwardly proceeding in a direction toward the open end of the barrel portion, said injection mold comprising:

an injection core mold having an outer surface defining the inner walls of said lip and barrel portions, said injection core mold being movable along a longitudinal axis relative to said preform;

an injection cavity mold having a cavity surface defining the outer wall of said barrel portion, said injection cavity mold being movable along the longitudinal axis relative to said preform;

a first lip cavity mold positioned adjacent to said injection cavity mold on mold closure and having a cavity surface defining an outer wall of a non-undercut area of said lip portion, said first lip cavity mold including a pair of lip cavity mold halves movable toward and away from each other in a transverse direction;

a second lip cavity mold positioned adjacent to said first lip cavity mold on mold closure and having a cavity surface defining an outer wall of the undercut area of said lip portion, said second lip cavity mold being movable along the longitudinal axis relative to said preform;

a mold driving mechanism comprising means for effecting an initial release movement of said second lip cavity mold relative to the preform in the longitudinal direction by an initial amount of movement required to secure a space around said undercut area and means for thereafter causing said injection core mold to move relative to said preform in the longitudinal direction while resiliently deforming said undercut area outwardly;

wherein said injection core mold includes a core pin for defining the inner walls of said lip and barrel portions and a proximal end portion having an external diameter larger than that of said core pin, and wherein said second lip cavity mold includes a cylindrical portion surrounding a portion of said proximal end portion and having an inner bottom wall formed therein at a position opposite to the proximal end portion of said injection core mold, and wherein said mold driving mechanism includes means for driving said second lip cavity mold in the direction of said longitudinal axis; and an actuator located between said proximal end portion and said inner bottom wall for transmitting the driving force from said second lip cavity mold to said injection core mold after said initial movement, but not transmitting the driving force from said second lip cavity mold to said injection core mold during said initial movement.

3. An injection mold for injection molding a preform having a cylindrical closed-end barrel portion and a lip portion formed in said barrel portion at the open end thereof, the lip portion including an undercut formed to extend inwardly proceeding in a direction toward the open end of the barrel portion, said injection mold comprising:

an injection core mold having an outer surface defining the inner walls of said lip and barrel portions, said injection core mold being movable along a longitudinal axis relative to said preform;

an injection cavity mold having a cavity surface defining the outer wall of said barrel portion, said injection cavity mold being movable along the longitudinal axis relative to said preform;

a first lip cavity mold positioned adjacent to said injection cavity mold on mold closure and having a cavity surface defining an outer wall of a non-undercut area of said lip portion, said first lip cavity mold including a pair of lip cavity mold halves movable toward and away from each other in a transverse direction;

a second lip cavity mold positioned adjacent to said first lip cavity mold on mold closure and having a cavity surface defining an outer wall of the undercut area of said lip portion, said second lip cavity mold being movable along the longitudinal axis relative to said preform;

a mold driving mechanism comprising means for effecting an initial release movement of said second lip cavity mold relative to the preform in the longitudinal direction by an initial amount of movement required to secure a space around said undercut area and means for thereafter causing said injection core mold to move relative to said preform in the longitudinal direction while resiliently deforming said undercut area outwardly;

wherein said injection core mold comprises a first injection core mold section movable relative to said preform in the direction of the longitudinal axis, said first injection core mold section having a core pin for defining the inner wall of said barrel portion and a second injection core mold section through which said core pin passes, said second injection core mold section being movable relative to said preform in the direction of the longitudinal axis and having a surface for defining the inner wall of said lip portion and wherein said mold driving mechanism is adapted to drive said first injection core mold section and said second lip cavity mold as a unit in the direction of the longitudinal axis, whereby said second injection core mold section can be released and moved together with said first injection core mold section and said second lip cavity mold as a unit after the initial release movement in which said first injection core mold section is moved together with said second lip cavity mold as a unit;

wherein said first injection core mold section includes a proximal end portion at a proximal end of said core pin and having an external diameter larger than that of said core pin; and wherein said second section of the injection core mold has a flange positioned to be engaged by said proximal end portion of said first section of the injection core mold, the second lip mold cavity includes a cylindrical portion having an inner wall, the inner wall of said cylindrical portion of said second lip cavity mold includes an inner stepped wall positioned to engage the flange portion of said second injection core mold section after said initial release movement and wherein a spring is disposed between said flange and an inner bottom wall of said cylindrical portion.

4. An injection mold for injection molding a preform having a cylindrical closed-end barrel portion and a lip portion formed in said barrel portion at the open end thereof, the lip portion including an undercut formed to extend inwardly proceeding in a direction toward the open end of the barrel portion, said injection mold comprising:

an injection core mold having an outer surface defining the inner walls of said lip and barrel portions, said injection core mold being movable along a longitudinal axis relative to said preform;

an injection cavity mold having a cavity surface defining the outer wall of said barrel portion, said injection cavity mold being movable along the longitudinal axis relative to said preform;

a first lip cavity mold positioned adjacent to said injection cavity mold on mold closure and having a cavity surface defining an outer wall of a non-undercut area of said lip portion, said first lip cavity mold including a pair of lip cavity mold halves movable toward and away from each other in a transverse direction;

a second lip cavity mold positioned adjacent to said first lip cavity mold on mold closure and having a cavity surface defining an outer wall of the undercut area of said lip portion, said second lip cavity mold being movable along the longitudinal axis relative to said preform;

a mold driving mechanism comprising means for effecting an initial release movement of said second lip cavity mold relative to the preform in the longitudinal direction by an initial amount of movement required to secure a space around said undercut area and means for thereafter causing said injection core mold to move relative to said preform in the longitudinal direction while resiliently deforming said undercut area outwardly;

wherein said injection core mold comprises a first injection core mold section movable relative to said preform in the direction of the longitudinal axis, said first injection core mold section having a core pin for defining the inner wall of said barrel portion and a second injection core mold section through which said core pin passes, said second injection core mold section being movable relative to said preform in the direction of the longitudinal axis and having a surface for defining the inner wall of said lip portion and wherein said mold driving mechanism is adapted to drive said first injection core mold section and said second lip cavity mold as a unit in the direction of the longitudinal axis, wherein said second injection core mold section can be released and moved together with said first injection core mold section and said second lip cavity mold as a unit after the initial release movement in which said first injection core mold section is moved together with said second lip cavity mold as a unit;

wherein said first injection core mold section includes a proximal end portion at a proximal end of said core pin and having an external diameter larger than that of said core pin; and wherein said second section of the injection core mold has a flange, the second lip mold cavity includes a cylindrical portion having an inner bottom wall at a position opposite to said flange portion of said second injection core mold section, said mold driving mechanism, further comprises:

an actuator located between said flange portion of the second injection core mold section and said inner bottom wall for transmitting the driving force from said second lip cavity mold to said second injection core mold section after said initial release movement, but not transmitting the driving force from said second lip cavity mold to said second injection core mold section during said initial release movement.

* * * * *